(12) United States Patent
Thomson et al.

(10) Patent No.: US 6,189,742 B1
(45) Date of Patent: Feb. 20, 2001

(54) DEVICE FOR DISPENSING GRANULAR MATERIAL

(76) Inventors: Susan A. Thomson, 910 E. Overbluff, Spokane, WA (US) 99203; Jeffrey L. Bendio, 13903 E. Sprague Ave. Ste. 8, Spokane, WA (US) 99216

( * ) Notice: Under 35 U.S.C. 154(b), the term of this patent shall be extended for 0 days.

(21) Appl. No.: 09/411,724

(22) Filed: Oct. 1, 1999

(51) Int. Cl.[7] ................................................. B65D 88/54
(52) U.S. Cl. ........................... 222/339; 222/362; 141/174
(58) Field of Search ..................................... 222/359, 370, 222/361, 362, 339, 360; 141/174, 175

(56) References Cited

U.S. PATENT DOCUMENTS

| D. 397,913 | * | 9/1998 | Miliani | D7/589 |
|---|---|---|---|---|
| 1,046,957 | * | 12/1912 | Brehm | 222/360 |
| 1,752,720 | * | 4/1930 | Bergelson | 222/359 |
| 2,363,155 | | 11/1944 | Smith | 222/185 |
| 2,561,721 | | 7/1951 | Ardito | 222/339 |
| 2,788,809 | | 4/1957 | Paton | 141/353 |
| 2,857,083 | * | 10/1958 | Masterson | 222/361 |
| 2,920,796 | | 1/1960 | Field | 222/185 |
| 3,092,292 | | 6/1963 | Mayer | 222/185 |
| 3,129,853 | * | 4/1964 | Hoskins | 222/339 |
| 3,169,675 | | 2/1965 | Gutzmann | 222/360 |
| 3,211,334 | | 10/1965 | McShea | 222/39 |
| 3,249,266 | * | 5/1966 | Cole et al. | 222/362 |
| 4,109,835 | | 8/1978 | Castro | 222/449 |
| 4,168,019 | | 9/1979 | Hausam | 222/185 |
| 4,203,527 | * | 5/1980 | LaChance | 220/253 |
| 4,266,695 | | 5/1981 | Ruperez | 222/185 |
| 4,394,941 | | 7/1983 | Recine | 222/355 |
| 4,448,331 | | 5/1984 | Millette | 222/181 |
| 4,962,872 | * | 10/1990 | Strong | 222/516 |
| 5,437,393 | | 8/1995 | Blicher | 222/77 |
| 5,437,396 | | 8/1995 | Russillo | 222/185.1 |
| 5,758,803 | | 6/1998 | Liao et al. | 222/440 |
| 5,823,398 | | 10/1998 | Russillo | 222/185.1 |
| 5,855,300 | | 1/1999 | Malki | 222/153.09 |

* cited by examiner

Primary Examiner—Philippe Derakshani
Assistant Examiner—Melvin A. Cartagena
(74) Attorney, Agent, or Firm—David S. Thompson

(57) ABSTRACT

A dispensing device is adapted for one-handed operation, and for release of a measured quantity of granular material. A base is generally disk-shaped. A stop is carried by an upper surface of the base, and is adjustably positionable so that when a container to be filled is moved into contact with the stop, that container is correctly positioned. A body 40 is attached to a support ledge defined about the perimeter of the base. The body is generally cylindrical, and defines an interior cavity with access through a front opening and a circular top having an off-center hole. A slide is supported by the top, and is manually movable between a loading position wherein a spring arm biasing the slide is relaxed, and a dispensing position wherein the spring arm is stressed. A slide enclosure is attached to the upper rim of the body portion. An input funnel provides an upper circular rim which is generally concentric with the sidewall of the body when viewed on end, and a lower circular rim which is in-line with the hole in the top of the circular top of the body. Short or long dispensing funnels may be attached a collar extending from the rim of the hole in the top of the body. A canister containing powdered or granular material, may be attached with an inverted orientation to the upper rim of the input funnel.

7 Claims, 5 Drawing Sheets

DEVICE FOR DISPENSING GRANULAR MATERIAL

CROSS-REFERENCES

There are no applications related to this application filed in this or any foreign country.

BACKGROUND

Dispensing devices positioned beneath hoppers are known. Such devices have been designed to dispense solid material in powder or granular form, including coffee, sugar, salt and similar materials. Use of a sliding plate, which fills with material in a first position, and which dispenses material in a second position, is also known.

Such dispensing devices have been generally successful within the scope for which their structural design was intended. They have, however, generally failed to provide the combination of structures and associated functionality required to result in widespread adoption.

The prior art has failed to disclose the combination of structures required for one-handed operation. One-handed operation is extremely advantageous for a dispenser used with baby formula; since one of the user's hands is typically required to carry the baby only one hand is available for operation of the dispenser.

The prior art has also failed to show the combination of structures required for automatic return of the apparatus to the starting position. Where a slide must be moved between a first and second position, it is typically the case that such movement is best done in a two-handed manner. Particularly where a spring is compressed, it is generally the case that one hand is required to stabilize the dispenser while a second hand is required to operate the dispenser.

The prior art has also failed to adequately disclose the structures required for attachment of a replaceable bulk container in a manner which results in orientation of the bulk container in-line with the body of the dispenser, but which results in delivery of the powdered material contained in the bulk container to a location that is off-center with respect to the body of the dispenser.

The prior art has also failed to show the adjustable structures required to properly center baby bottles or similar containers of differing sizes under the dispenser in a manner that results in the mouth of the container being properly positioned. Due to the number of differently sized containers, it is commonly the case that the user must rely on manual dexterity and coordination to properly position the container.

The prior art has also failed to show the adjustable structures required to deliver the material from the dispenser into containers of differing heights without resulting in spillage. Due to the difference in the height of containers to be filled, it is commonly the case that the user may desire to lift the container to an appropriate location. However, this movement is in conflict with the inability of prior art dispensers to operate in a one-handed manner.

What is needed is a device for dispensing granular material which is easily operated in a one-handed manner. The dispensing device should provide for automatic return of all components to the starting position. The dispensing device should also provide structures for attachment of a bulk container and diversion of the material from an in-line to an off-center orientation; structures for centering a container to be filled under the dispenser, and structures for compensating for the differing heights of different containers to be filled.

SUMMARY

The present invention is directed to an apparatus that satisfies the above needs. A novel device for dispensing granular material is disclosed, which provides some or all of the following structures.

(A) A base is generally disk-shaped, having a diameter slightly larger than the diameter of the cylindrical canister of granular material.

(B) A stop is adjustably carried by the upper surface of the base. When a container to be filled is placed on the base, it is moved against the stop, thereby correctly positioning the container to be filled underneath the dispensing funnel. A preferred stop provides left and right fences, and is attached to the base by fasteners allowing the stop to be positioned in a location required by the shape and size of the container to be filled.

(C) A body portion is carried by the base, and provides a sidewall which defines an interior cavity within which the container to be filled my be located. The body portion includes a top which defines a hole through which the granular material passes.

(D) A slide is supported on the upper surface of the top of the body portion. The slide includes a base through which a hole is defined which is sized to contain a measured amount of granular material to be dispensed. The slide additionally includes a spring arm which biases the slide to the loading position. A pivoting handle, extending in a radial direction from a rounded edge portion of the slide, allows one-handed manual manipulation of the slide between a loading position wherein the spring arm is relaxed and a dispensing position wherein the spring arm is stressed.

(E) A slide enclosure is attached to the upper rim of the body portion. The slide enclosure is sized to enclose the base and spring arm portions of the slide, while allowing the pivoting handle to extend through a pivot handle travel slot. An axle, extending from the slide enclosure and into a corresponding axle hole defined in the slide, allows the slide to pivot between the relaxed loading position and the stressed dispensing position.

(F) The input funnel provides an upper circular rim which is generally concentric with the sidewall of the body when viewed on end, and a lower circular rim which is off-center. The lower circular rim of the input funnel is carried by the rim of the hole defined in the upper surface of the slide enclosure.

(G) Short or long dispensing funnels may be attached a collar extending from the rim of the hole in the top of the body. A short dispensing funnel may be preferred where the container to be filled is tall; a long dispensing funnel may be preferred where the container to be filled is short.

(H) A canister containing powdered or granular material, such as baby formula, coffee, coffee creamer, sugar or other food or non-food material, may be attached with an inverted orientation to the upper rim of the input funnel.

It is therefore a primary advantage of the present invention to provide a novel device for dispensing granular material which is easily operated in a one-handed manner, dispenses a pre-measured quantity and which automatically returns to a starting position when released by the user.

Another advantage of the present invention is to provide a novel device for dispensing granular material from a container which prevents contamination of the granular material by maintaining a seal with the container and by eliminating the need to touch the granular material with a scoop during the dispensing process.

Another advantage of the present invention is to provide a novel device for dispensing granular material which provides structures for centering a container to be filled under the dispenser.

A still further advantage of the present invention is to provide a novel device for dispensing granular material which provides structures for compensating for the differing heights of different containers to be filled in a manner which prevents spillage and which therefore provides more accurate measurement of the granular material.

DRAWINGS

These and other features, aspects, and advantages of the present invention will become better understood with regard to the following description, appended claims, and accompanying drawings where:

DESCRIPTION

Figure 1:
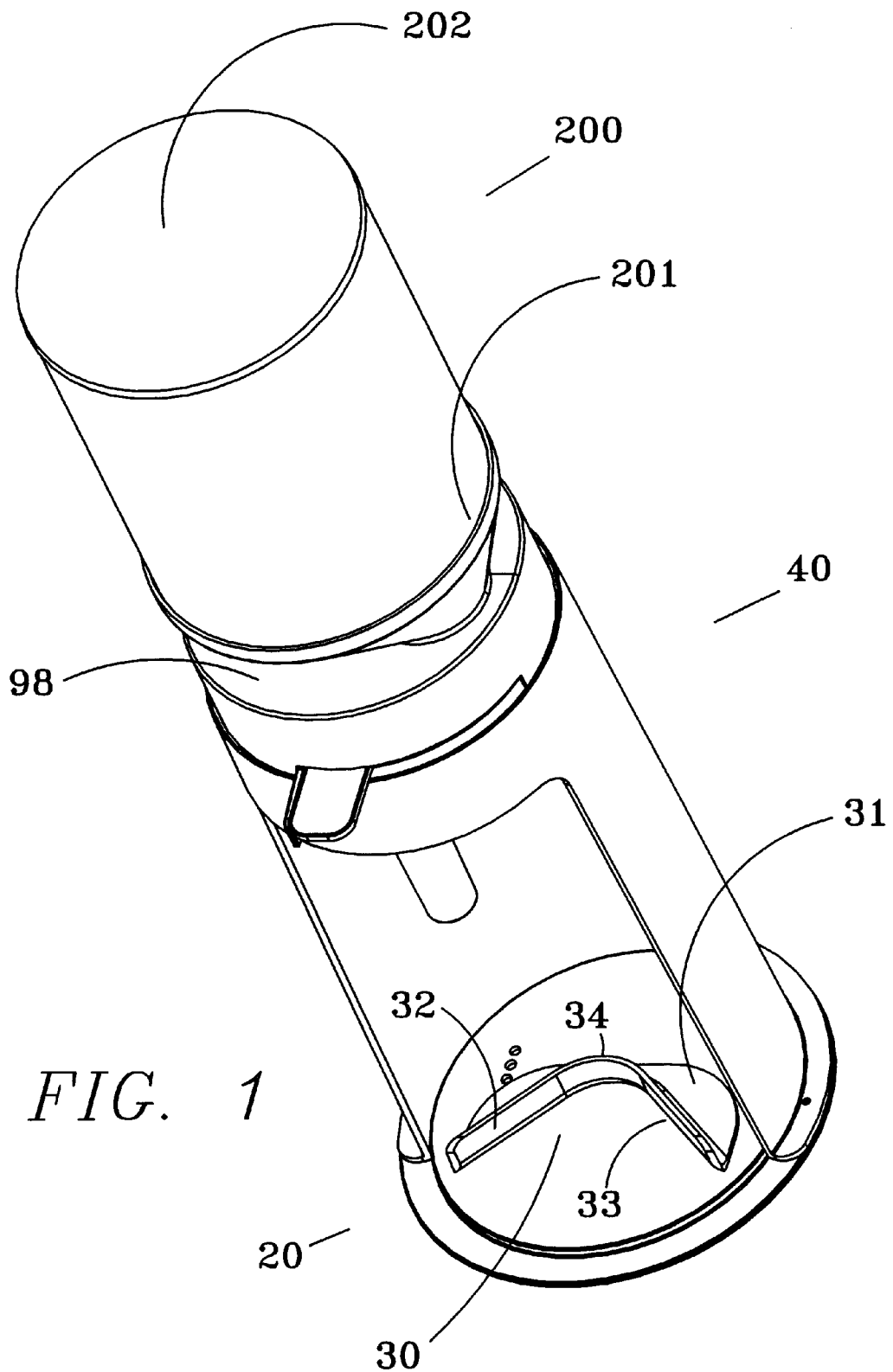
FIG. 1 is a perspective view of a version of the device for dispensing granular material.

Referring in generally to FIGS. 1 through 5, a device 10 for dispensing granular material constructed in accordance with the principles of the invention is seen. A base 20 is generally disk-shaped. A stop 30 is carried by an upper surface of the base, and is adjustably positionable so that when a container to be filled is moved into contact with the stop, that container is correctly positioned. A body 40 is attached to a support ledge defined about the perimeter of the base. The body is generally cylindrical, and defines an interior cavity with access through a front opening and a circular top having an off-center hole. A slide 70 is supported by the top, and is manually movable between a loading position wherein a spring arm biasing the slide is relaxed, and a dispensing position wherein the spring arm is stressed. A slide enclosure 90 is attached to the upper rim of the body portion. An input funnel 120 provides an upper circular rim which is generally concentric with the sidewall of the body when viewed on end, and a lower circular rim which is in-line with the hole in the top of the circular top of the body. Short or long dispensing funnels 60, 65 may be attached a collar extending from the rim of the hole in the top of the body. A canister 200 containing powdered or granular material, may be attached with an inverted orientation to the upper rim of the input funnel.

A base 20 is a generally planar disk which supports the stop 30 and the body 40. The base has an upper surface 21 and a lower surface 22. An outer rim 23 has a diameter slightly larger than the diameter of the cylindrical canister 200 of granular material. An inner rim 24 is elevated slightly above an annular support ledge 25. Fastener pegs 26 protrude from the surface of the annular support ledge, and are sized for attachment to corresponding fastener holes 42 defined in a lower flange 41 of the body 40. If desired, the location of the fastener pegs 26 and fastener holes 42 could be reversed, or alternate fastening means substituted.

Figure 2:
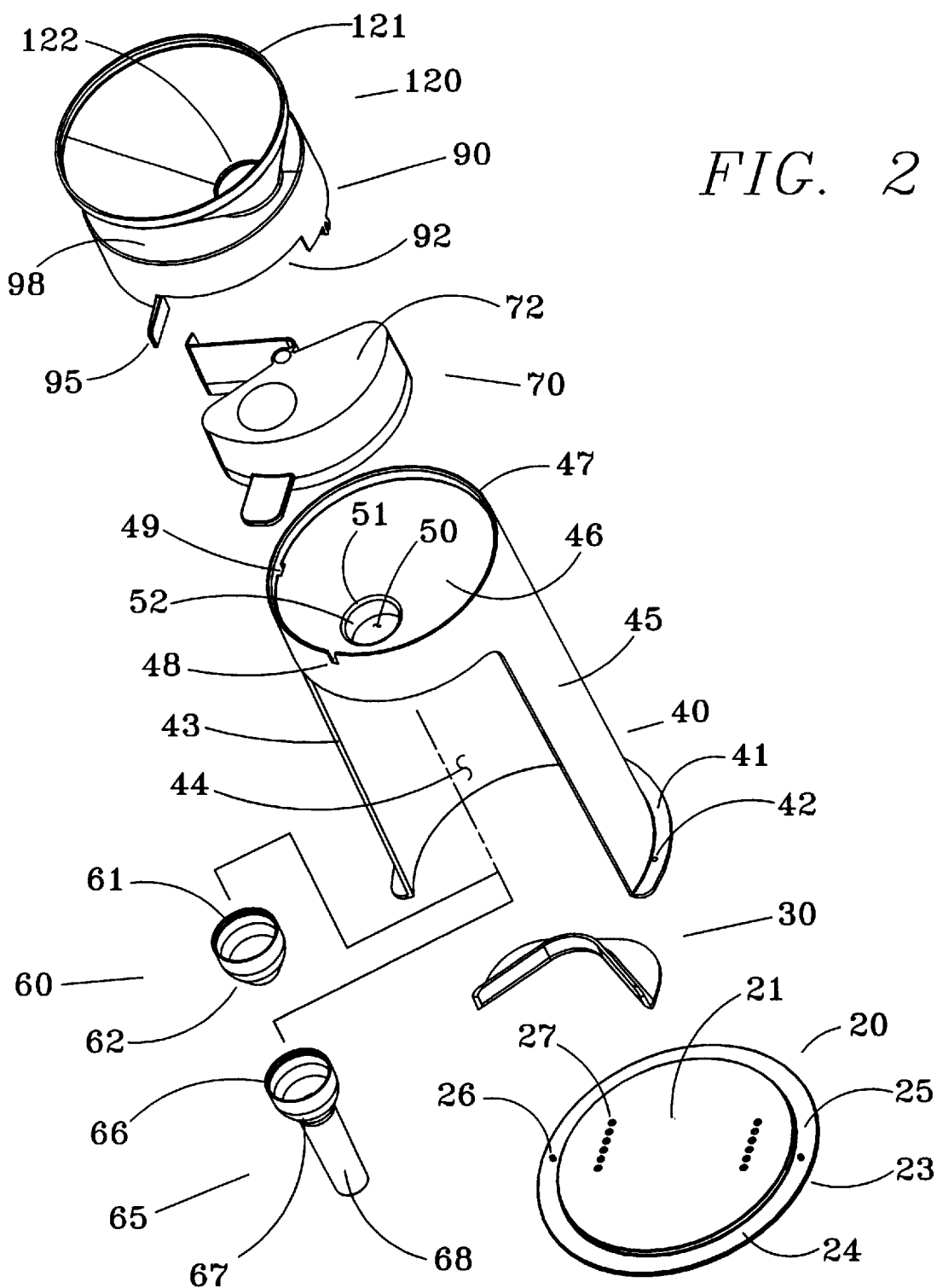
FIG. 2 is an exploded perspective view of the dispenser of FIG. 1, with the canister removed to allow the drawing to be enlarged.
Figure 3:
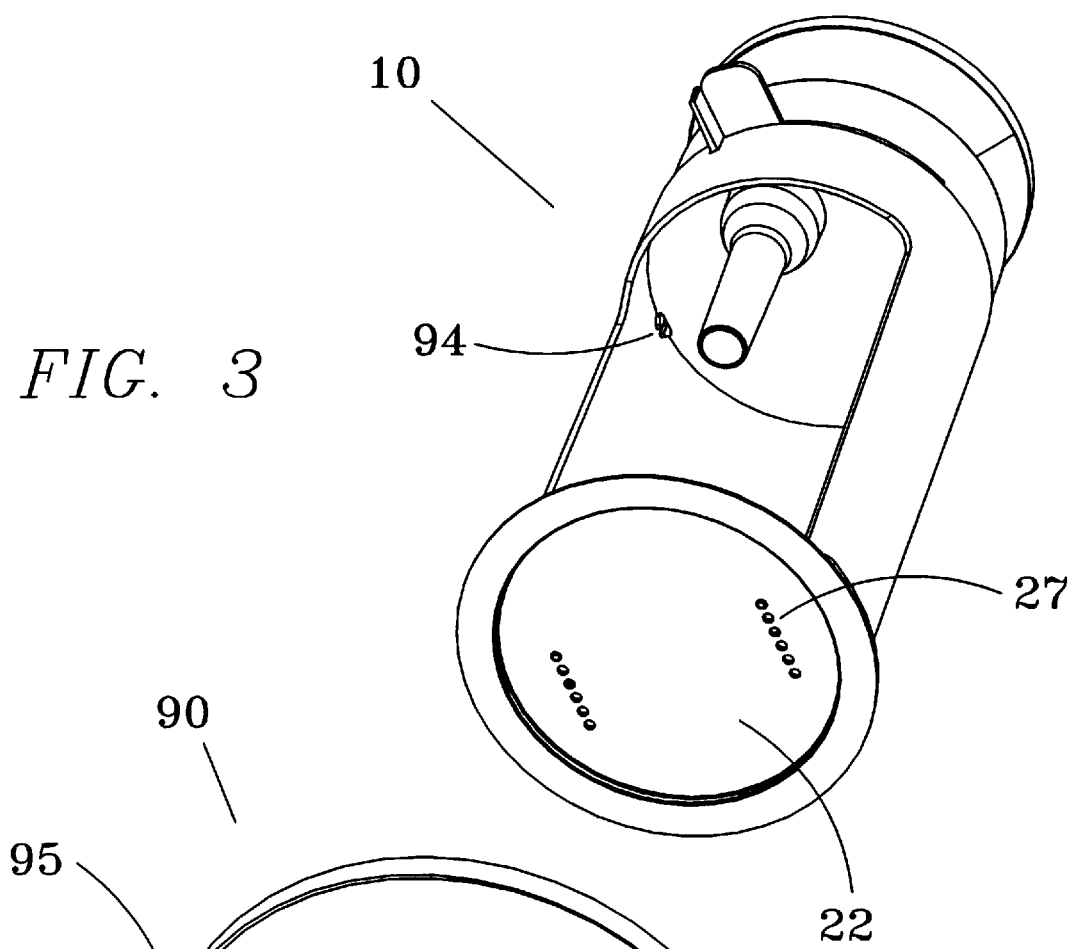
FIG. 3 is a perspective view of the dispenser with canister removed and the long dispensing funnel attached, as viewed from below.

As seen in FIGS. 1, 2 and 3, a plurality of adjustment holes 27 are defined in two columns between the upper and lower surfaces 21, 22 of the base. The adjustment holes allow for control over the position of the stop 30 relative to the body 40 and dispensing funnels 60, 65. In the preferred embodiment, six distinct positions are available; however, the number of positionable locations is arbitrary and could be altered to better suit any specific need.

A stop 30 is adjustably carried by the upper surface 21 of the base 20. When a container to be filled is placed on the base, the container is moved into contact with the stop, thereby correctly positioning the container to be filled underneath the dispensing funnel 60 or 65. As seen in FIGS. 1 and 2, a stop 30 provides left and right fences 32, 33, which are connected by a rounded corner fence 34. The preferred shape of the fence, and the stop itself, is dependent to a large degree on the expected size and shape of the container to be filled. The stop of FIGS. 1 and 2 is particularly adapted to a container to be filled having a generally square cross-section with rounded corners. However, for example, where the container to be filled has a round cross-section, the stop may provide a single, rounded fence.

A footing 31 of the stop 30 is attached to the base 20 by fasteners allowing the stop to be positioned in a location required by the shape and size of the container to be filled. In a preferred embodiment, a pair of fastener pegs 35 are sized to engage one adjustment hole 27 in each of the two columns. By careful selection of the adjustment holes chosen for attachment to the fastener pegs, the location of the stop may be regulated to result in correct positioning of the container to be filled under the dispensing funnel.

As seen in FIGS. 1, 2 and 3, a body 40 portion is carried by the base 20. A lower portion of the body defines a flange 41 through which fastener holes 42 are defined. The fastener holes 42 are sized for attachment to the fastener pegs 26 of the supporting ledge 25 of the base.

A sidewall 45 having a front opening 43 defines an interior cavity 44. The upper portion of the sidewall supports a generally round, planar top 46 located incrementally below an upper rim 47 of the sidewall. As seen in FIGS. 2 and 3, a notch 48 in the rim 47 accommodates the stationary arm 95 of the slide enclosure. Diametrically opposed openings 49 defined in the top 46 are sized for releasable connection to the locking tabs 94 of the slide enclosure 90.

As seen in FIG. 2, a hole 50 defined in the top 46 allows passage of granular material. The location of the hole 50 in the top 46 is off-center, in that the rim 51 of the hole is not concentric with the circular top and rim 47 of the sidewall 45 of the body 40. A collar 52 extends from the lower surface of the top and allows frictional attachment of either dispensing funnel 60, 65.

Figure 5:
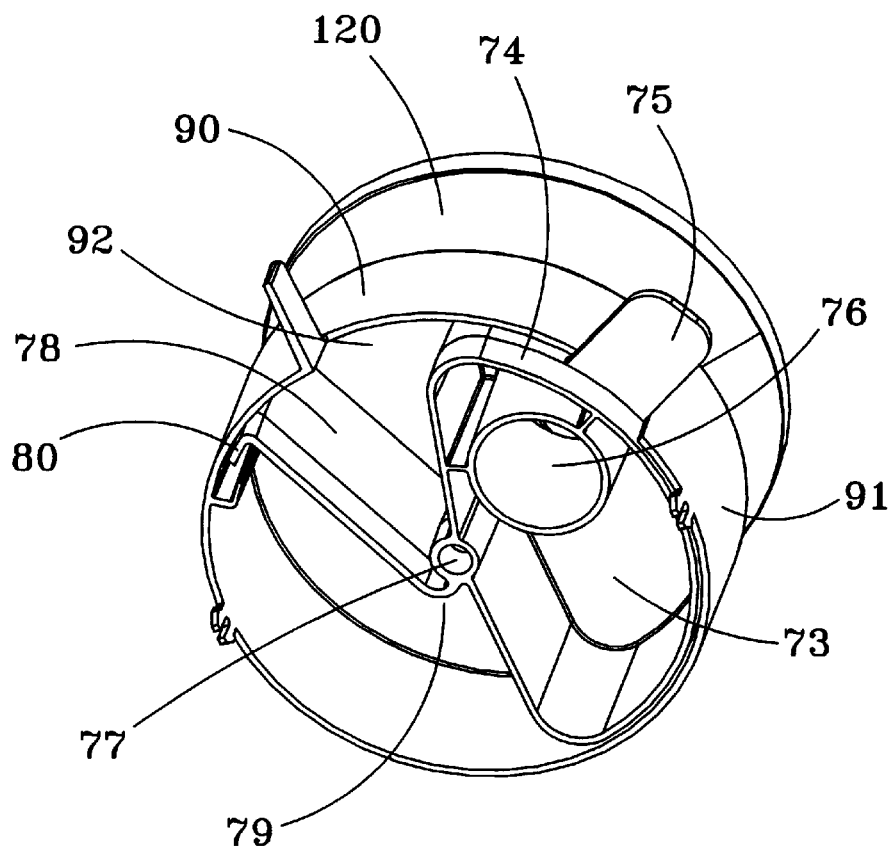
FIG. 5 is a perspective view of the slide, carried within the slide enclosure.
Figure 6:
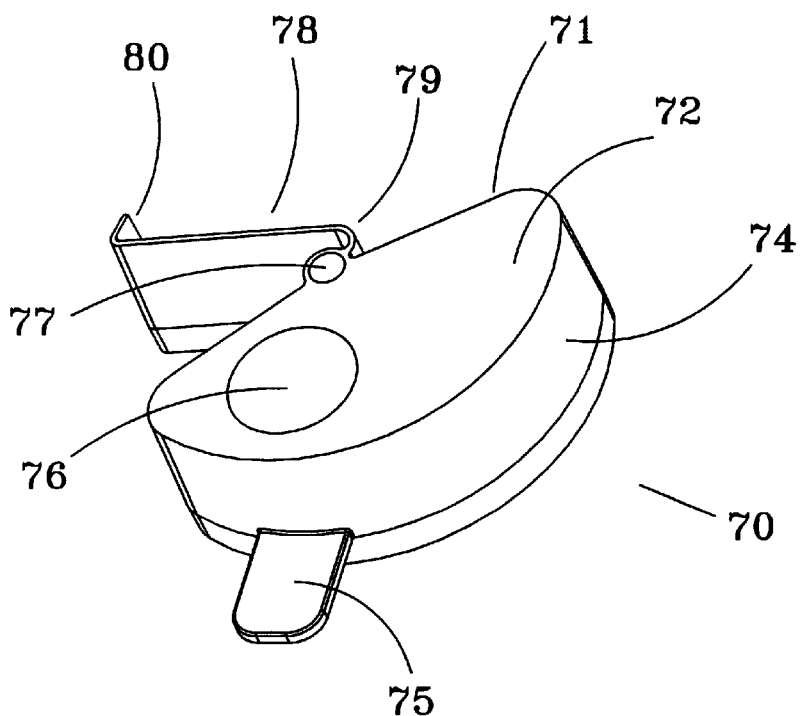
FIG. 6 is a perspective view of the slide.

As seen in FIGS. 2, 5 and 6, a slide 70 is supported on the upper surface of the top 46 of the body portion 40. The slide includes a body 71 having upper and lower surfaces 72, 73 between which a cavity 76 is defined. The cavity 76 is generally cylindrical, having upper and lower round end openings sized to match the diameter of the hole 50 defined in the top 46 and the hole 99 defined in the top cover 98 of the slide enclosure. The body also provides a rounded edge 74 having a curvature which conforms to that of the rim 47 of the body 40.

The slide 70 additionally includes a spring arm 78 which biases the body of the slide to the loading position, seen in FIG. 5. The spring arm includes a spring elbow 79 which is stressed sightly when the slide is in the stressed dispensing position, seen in FIGS. 1 and 3, and which relaxes when the slide is in the relaxed loading position, seen in FIG. 3. A locking tab 80 on the end of the spring arm is sized to lock into the spring socket 96 defined in the slide enclosure 90.

As seen particularly in FIG. 6, a pivoting handle 75, extends in a radial direction from the rounded edge portion 74 of the slide 70. The pivoting handle 75 travels within the pivot handle travel slot 92 defined in the rounded sidewall 91 of the slide enclosure 90.

Figure 4:
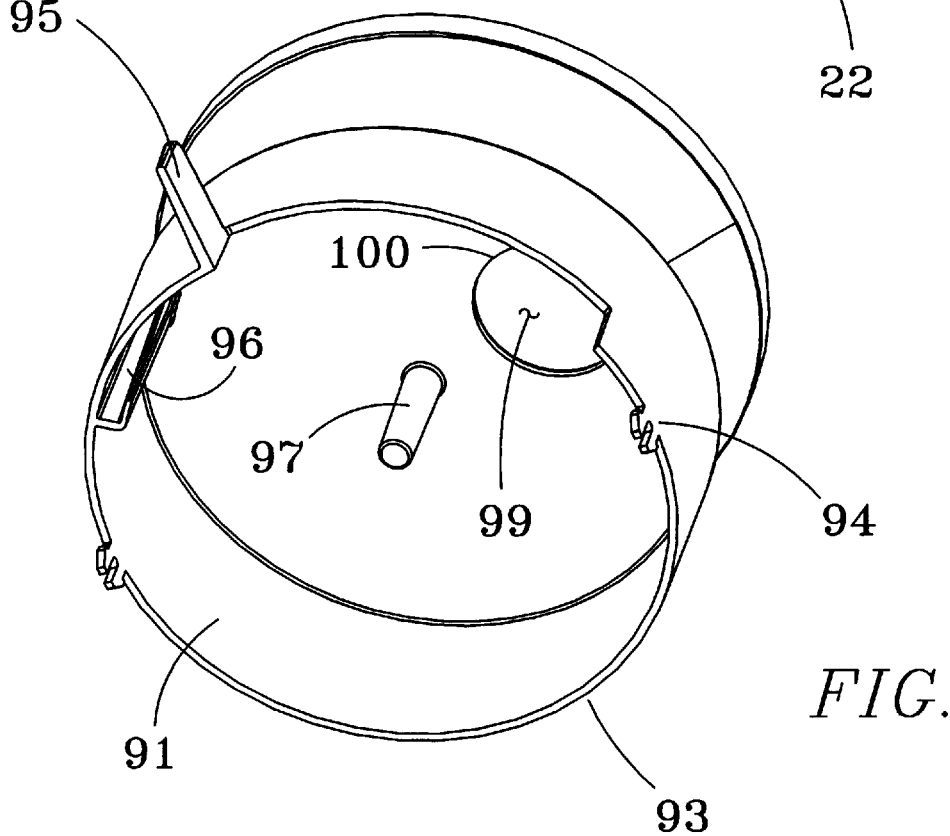
FIG. 4 is a perspective view of the lower surface of the slide enclosure.

An axle hole 77 is seen in FIGS. 2, 5 and 6, and is sized to engage the axle 97 seen in FIG. 4 extending from the top cover of the slide enclosure 90. The slide 70 is therefore able to pivot about the axle 97 from the relaxed loading position seen in FIG. 5, to the stressed dispensing position seen in FIG. 1.

As particularly seen in FIGS. 2 and 4, a slide enclosure 90 is attached to the upper rim of the body portion 40. Diametrically opposed locking tabs 94 are positioned to engage the openings 49 in the top 46, and allow releasable attachment of the slide enclosure to the body 40.

A rounded sidewall 91 of the slide enclosure has incrementally less outside diameter than the inside diameter of the rim 47 of the body 40. Therefore, as seen in FIG. 1, in assembly, the rounded sidewall 91 is inserted inside the rim 47 of the sidewall 45 of the body 40, allowing the rim 93 of the slide enclosure to rest on the outer perimeter of the top 46.

The rounded sidewall 91 allows for the rounded edge 74 of the slide to rotate within the slide enclosure. A pivot handle travel slot 92, defined in the rounded sidewall 91, allows the pivoting handle 75 of the slide 70 to travel between the loading and dispensing positions.

As seen in FIG. 2 and 4, a stationary arm 95 extends radially outward from the rounded sidewall 91, and provides a location typically used during operation by a thumb or index finger, which allows the pivoting handle 75 to be moved without resulting in movement of the entire device 10.

A spring socket 96 is sized to accept the locking tab 80 of the spring arm of the slide, preventing the spring arm from moving during operation. An axle 97 extends from a central point in the inside surface of the top cover 98, where it engages the axle hole 77 in the slide, allowing the slide to pivot between the loading position wherein the spring arm 78 is relaxed, and the dispensing position wherein the spring arm is stressed.

A hole 99 is defined through the top cover 98 of the slide enclosure, and allows the passage of granular material from the input funnel 120 into the cavity 76 defined in the slide 70. The rim 100 of the hole 99 is off-center with respect to the top cover 98; i.e. the rim 100 is not concentric with respect to the top cover. As a result, the rim 100 is in-line with the cavity 76 defined in the slide 70 when the slide is in the relaxed loading position, thereby allowing granular to pass from the input funnel 120 into the cavity 76.

As seen in FIGS. 1 and 2, an input funnel 120 transfers granular material from the canister 200 through the hole 99 in the slide enclosure 90, and into the cavity 76 defined within the slide 70.

An upper circular rim 121 of the input funnel is generally concentric with the sidewall of the body when viewed on end. The upper circular rim is sufficiently flexible and resilient to allow releasable attachment of the open end 201 of the canister 200.

A lower rim 122 is generally concentric with the hole 99 defined in the top cover 98 of the slide enclosure. The lower rim is attached to the rim 100 of the hole 99, thereby supporting the input funnel 120 in a position above the slide enclosure 90, as seen in FIGS. 1 and 2.

Figure 1A:
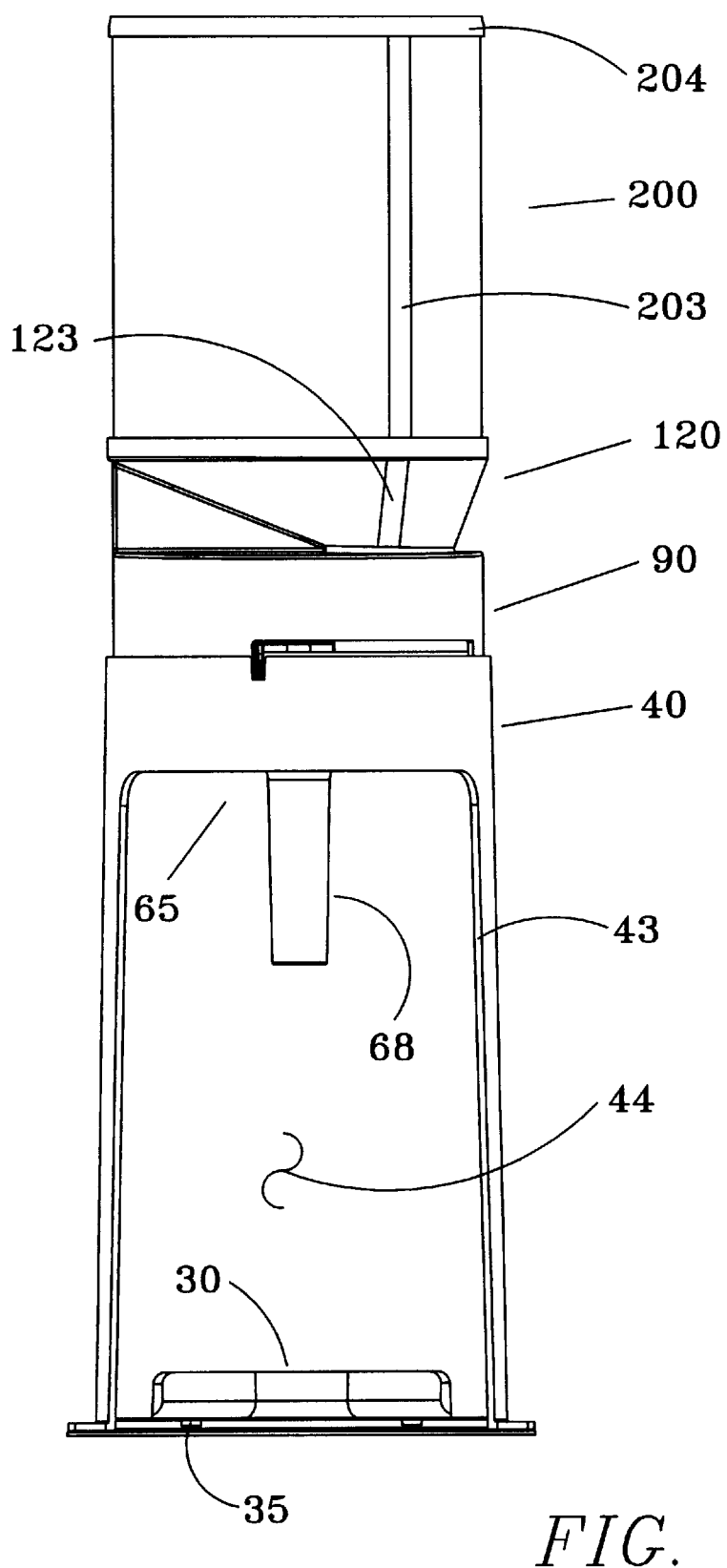
FIG. 1A is an orthographic side view of the dispenser of FIG. 1, having a different version of the canister.

As seen in FIG. 1A, a version of the input funnel provides a clear viewing window 123 which allows the user to view the powdered or granular material carried within. When the clear viewing window reveals that the quantity of material is low, the user is alert to the need to replace the canister.

Short or long dispensing funnels may be attached the collar 52 which extends downwardly from the rim 51 of the hole 50 in the top 46 of the body 40. A short dispensing funnel 60 may be preferred where the container to be filled is tall; a long dispensing funnel 65 may be preferred where the container to be filled is short.

As seen in FIG. 2, the short dispensing funnel 60 includes a rim 61 sized for frictional fit on the collar 52 encompassing the hole 50 in the top 46 of the body 40. The funnel portion 62 tends to concentrate the granular material into the opening of a taller container to be filled located in the interior cavity 44 of the body.

Continuing to refer to FIG. 2, the long dispensing funnel 65 includes a similar rim 66 and funnel 67. An extension tube 68 keeps the granular material concentrated as that material is transferred from the cavity 76 to the container to be filled, and therefore prevents dissipation and spillage of the granular material when the container to be filled is relatively short.

A canister 200 containing powdered or granular material, such as baby formula, coffee, coffee creamer, sugar or other food or non-food material, may be attached to the dispensing device 10. In a typical application, the canister is disposable and is full of powdered or granular material when purchased. In this situation, the canister provides an open top end 201 and a closed bottom end 202. In use, the canister is inverted, with the open end 201 attached to the upper rim 121 of the input funnel. As a result, granular material is transferred from the canister into the input funnel 120.

As seen in FIG. 1A, the canister may alternatively be designed with a resealable lid 204 which closes the bottom end 202. Such a canister with a lid on the bottom end would be adapted for refilling with material from a large bulk container, and would therefore tend to remain in the inverted position indefinitely. The lid 204 would be removed, the canister refilled, and the lid replaced. In this version of the invention, the canister would not need to be removed from the upper rim of the input funnel for refilling.

Continuing to refer to FIG. 1A, the canister may optionally provide a clear viewing window 203 defined vertically, between the top and bottom ends of the canister. The clear viewing window is typically made of transparent plastic. The clear viewing window allows the user to monitor the quantity of granular material contained within the canister, and to plan ahead to purchase additional granular material. When additional material is needed, the resealable lid 204 is removed, allowing the addition of material from a bulk source.

In operation, the slide 70 is assembled between the top 46 of the body and the slide enclosure 90. The locking tab 80 of the spring arm 78 is placed into the spring socket 96 of the slide enclosure. The pivoting handle 75 of the slide is positioned to extend through the pivot handle travel slot 92 'defined in the rounded sidewall 91 of the slide enclosure 90. The locking tabs 94 of the slide enclosure are gently inserted into the openings 49 in the top 46 of the body, where they lock into place.

The fastener pegs 26 of the base 20 are attached to the fastener holes 42 of the flange 41 of the body 40, thereby securing the base to the body.

The fastener pegs 35 of the stop 30 are attached to a pair of the adjustment holes 27 defined in the base. The adjustment holes selected are those which result in a desirable location for the stop. The location of the stop should be selected so that for a given container to be filled, when that container is placed within the interior cavity 44 and against the stop, the mouth of the container is located directly under the dispensing funnel.

Either the short or long dispensing funnel 60, 65 should be attached to the collar 52. Where the container to be filled will fit under the long dispensing funnel, it is typically desirable to use this dispensing funnel. Where the container to be filled is too tall to fit under the long dispensing funnel, the short dispensing funnel should be used.

Once assembled, the dispensing device is inverted, so that the upper rim 121 of the input funnel may be attached to the open top end 201 of the canister 200 of granular material. Such a canister may contain baby formula or other food or non-food product. Once attached, the dispensing device 10 and attached canister 200 may be oriented as seen in FIG. 1, with the canister in an inverted position on top of the dispensing device, and the base 20 of the dispensing device supported by a table or counter top.

To dispense granular material, the user places the container to be filled against the stop 30, and under the dispensing funnel. The user then positions an index finger (or thumb) on the pivoting handle 75, and the thumb (or index finger) of the same hand on the stationary arm 95. By moving the pivoting handle to a position adjacent to the stationary arm, as seen in FIG. 1, the slide is moved into the stressed dispensing position. Movement of the slide in the manner causes the spring elbow 79 to be stressed, causing it to absorb a small amount of energy. The granular material carried in the cavity 76 then moves through the hole 50 and through the dispensing funnel 60 or 65, and into the container to be filled.

Release of the pivoting handle allows the energy in the spring arm 78 to move the slide 70 into the relaxed loading position, as seen in FIG. 5. In this position, granular material moves from the canister into an upper portion of the input funnel 120, and from a lower portion of the input funnel, through the hole 99 in the top cover 98 of the slide enclosure, and into the cavity 76 in the slide 70.

The previously described versions of the present invention have many advantages, including a primary advantage of providing a novel device for dispensing granular material which is easily operated in a one-handed manner, dispenses a pre-measured quantity and which automatically returns to a starting position when released by the user.

Another advantage of the present invention is to provide a novel device for dispensing granular material from a container which prevents contamination of the granular material by maintaining a seal with the container and by eliminating the need to touch the granular material with a scoop during the dispensing process Another advantage of the present invention is to provide a novel device for dispensing granular material which provides structures for centering a container to be filled under the dispenser.

A still further advantage of the present invention is to provide a novel device for dispensing granular material which provides structures for compensating for the differing heights of different containers to be filled in a manner which prevents spillage and which therefore provides more accurate measurement of the granular material.

The invention resides not in any one of these features per se, but rather in the particular combination of all of them herein disclosed and claimed and it is distinguished from the prior art in this particular combination of all of its structures for the functions specified.

Although the present invention has been described in considerable detail and with reference to certain preferred versions, other versions are possible. For example, while the preferred embodiment of the dispenser is oriented in such a manner the hole defined in the slide fills when in the relaxed state, and discharges in the stressed state, the activities associated with these states could be reversed. Similarly, while various fastening means have been defined, including for example, fastener pegs and corresponding fastener holes, it should be clear that in some cases the location of the pegs and holes could be reversed, or that in all cases equivalent fasteners could be used. Therefore, the spirit and scope of the appended claims should not be limited to the description of the preferred versions disclosed.

In compliance with the U.S. Patent Laws, the invention has been described in language more or less specific as to methodical features. The invention is not, however, limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A dispensing device for releasing a measured quantity of granular material from a canister containing granular material, the dispensing device comprising:

(A) a body portion having a sidewall which defines an interior cavity and having a top which defines a hole;

(B) a slide, supported on an upper surface of the top of the body portion, the slide having a body within which a cavity is defined, a spring arm which biases the position of the slide between the loading position and the dispensing position, and a pivoting handle extending in a radial direction from a rounded sidewall of the slide;

(C) a slide enclosure, attached to an upper rim of the body portion, enclosing the body and spring arm of the slide, the slide enclosure having an axle extending into an axle hole defined in the slide;

(D) an input funnel having an upper circular rim which is concentric with the sidewall of the body when viewed on end, and a lower circular rim which is off-center, the lower circular rim of the input funnel carried by a rim of a hole defined in the upper surface of the slide enclosure; and (E) a disk-shaped base, supporting the body portion, the disk-shaped base defining a plurality of adjustment holes between an upper and a lower surface.

2. The dispensing device of claim 1, further comprising a stop, adjustably carried by the adjustment holes, having at least one fence extending substantially perpendicularly from the upper surface of the disk-shaped base.

3. The dispensing device of claim 2, further comprising a dispensing funnel attached to a collar extending from a rim of the hole defined in the top of the body portion.

4. The dispensing device of claim 3, further comprising attachment means, defined on the upper circular rim of the input funnel, for attachment of a canister containing granular material.

5. The dispensing device of claim 1, further comprising a dispensing funnel attached to a collar extending from a rim of the hole defined in the top of the body portion.

6. The dispensing device of claim 5, further comprising attachment means, defined on the upper circular rim of the input funnel, for attachment of a canister containing granular material.

7. A dispensing device, for releasing a measured quantity of granular material, comprising:
- (A) a disk-shaped base defining a plurality of adjustment holes between an upper and a lower surface;
- (B) a stop, adjustably carried by the adjustment holes, having at least one fence extending substantially perpendicularly from the upper surface of the disk-shaped base;
- (C) a body portion, carried by the base, having a sidewall which defines an interior cavity and having a top which defines a hole;
- (D) a slide, supported on an upper surface of the top of the body portion, the slide having a body within which a cavity is defined, a spring arm which biases slide into a loading position, and a pivoting handle extending in a radial direction from a rounded edge portion of the body portion of the slide;
- (E) a slide enclosure, attached to an upper rim of the body portion, enclosing the body and spring arm portions of the slide, the slide enclosure having an axle extending into an axle hole defined in the slide;
- (F) an input funnel having an upper circular rim which is concentric with the sidewall of the body when viewed on end, and a lower circular rim which is off-center, the lower circular rim of the input funnel carried by a rim of a hole defined in the upper surface of the slide enclosure;
- (G) a canister, attached to the upper circular rim of the input funnel, having a clear viewing window defined vertically, between a top end and a bottom end of the canister;
- (H) a dispensing funnel attached to a collar extending from a rim of the hole defined in the top of the body portion; and
- (I) attachment means, defined on the upper circular rim of the input funnel, for attachment of a canister containing granular material.

* * * * *